Sept. 7, 1965  P. C. CULVER ETAL  3,205,474
SOCKET CONNECTOR
Filed Nov. 12, 1963  2 Sheets-Sheet 2
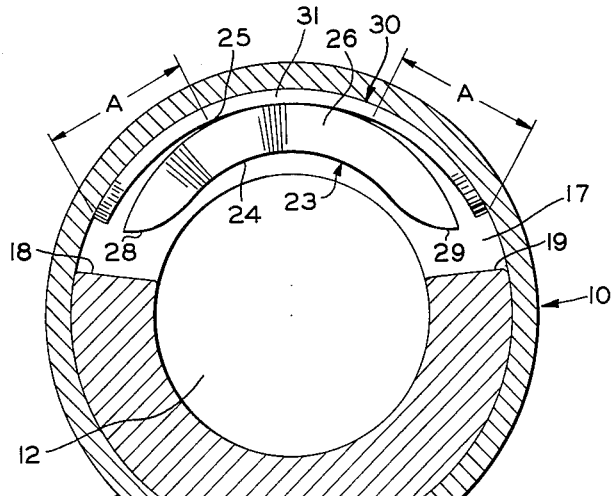
FIG. 7
FIG. 5
FIG. 6
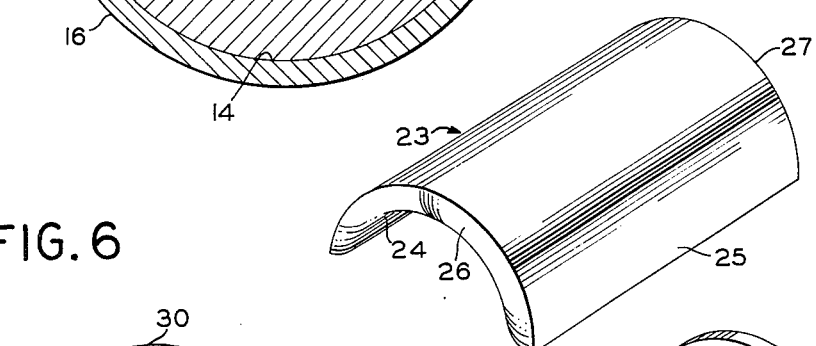
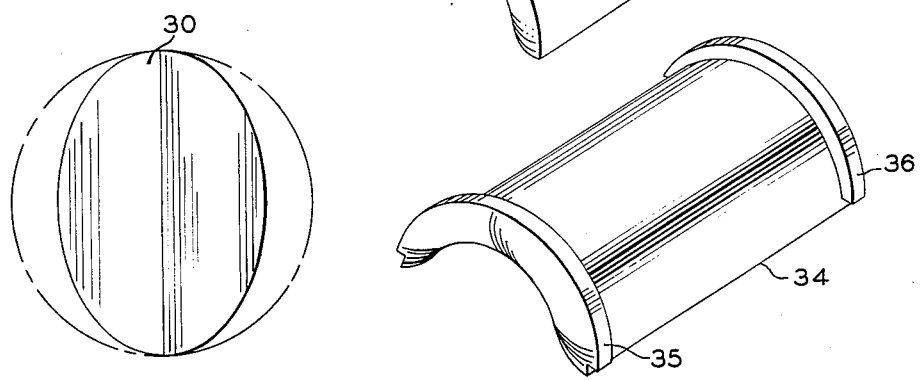
FIG. 9
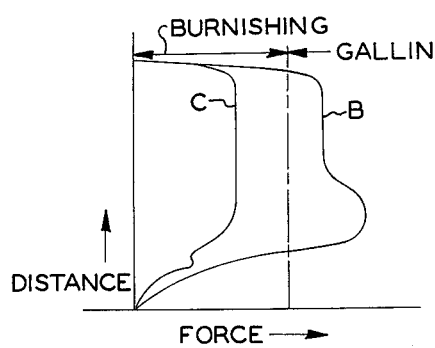
FIG. 8
INVENTORS.
PERRIN C. CULVER
EWALT H. ROCKS
BY
Gausewitz & Carr
ATTORNEYS United States Patent Office 3,205,474
Patented Sept. 7, 1965

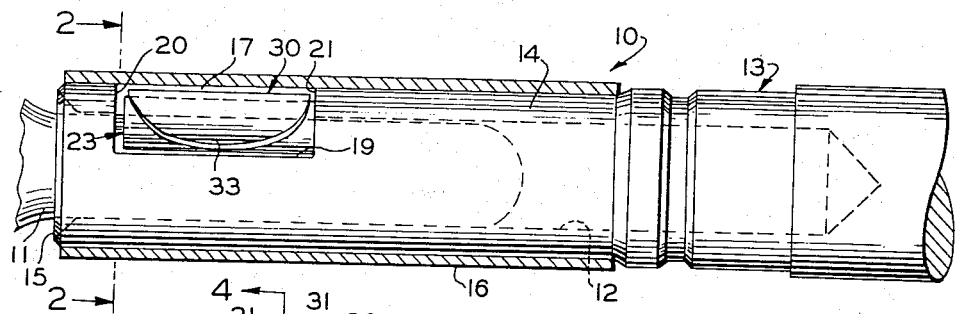
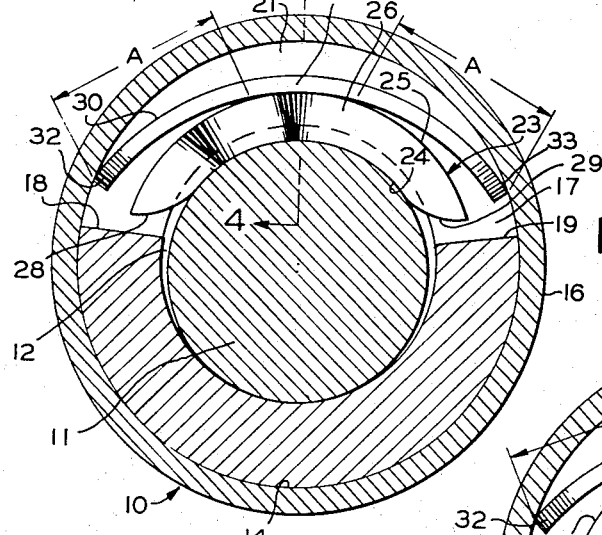
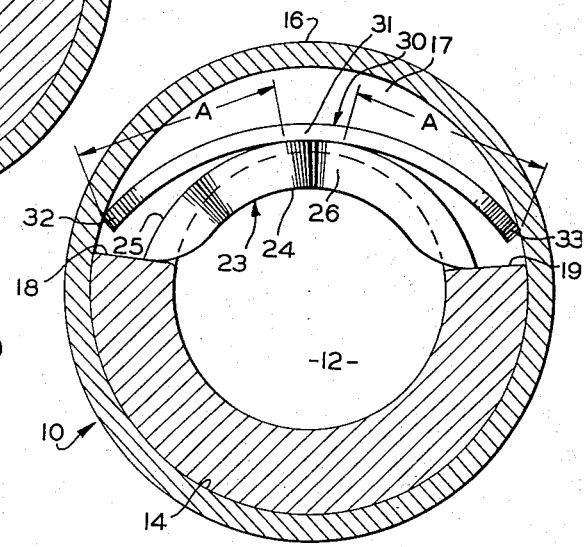
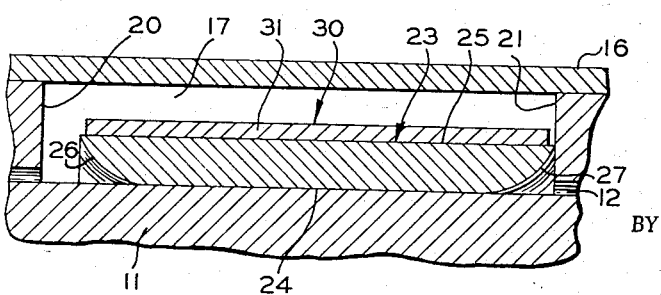

3,205,474
SOCKET CONNECTOR
Perrin C. Culver, Compton, and Ewalt H. Rocks, Fullerton, Calif., assignors to The Deutsch Company, Los Angeles, Calif., a corporation of California
Filed Nov. 12, 1963, Ser. No. 322,853
5 Claims. (Cl. 339—255)

This invention pertains to a socket for receiving a pin utilized in making an electrical connection. Connector sockets of the general type of this invention normally are utilized in joining together individual conductors of cables which are made up of a number of electrical leads. Typically, there will be a group of connector sockets held in a closely spaced relationship within an insulating block, each being joined to a different electrically conductive wire. A group of pins will be carried by the other section of the connector, each pin being connected at one end to a wire and at the other end being adapted to enter one of the sockets. To complete the electrical connection between the two cables, therefore, the pins are advanced into the sockets, and the retaining elements of the connector secured.

Performance specifications for connectors of this type are exacting. Not only must there be a good electrical contact made when the pins enter the sockets, but there must be resistance to wear to permit many cycles of connecting and disconnecting the connector assembly. The conventional design has included in the socket a leaf spring that is to engage the pin, and intended to firmly hold the pin against one side of the socket and assure electrical conductivity. These springs, however, have been vulnerable to damage from test probes. This occurs when the electrician testing the circuit will insert a probe into the socket to determine the continuity of the connection to the wire of the socket. Frequently, the test probe will be inserted only partially into the depth of the socket, so that the probe may be at an angle with respect to the socket, and will exert side forces that impose extreme loads on the springs in the sockets. Such loads exerted at the center portions of the springs frequently cause permanent deformation and consequent loss of spring force. This can lead to a loss of electrical continuity and failure of the electrical connection.

Increasing spring strength to give more resistance to the force of the test probe has nevertheless been unsuccessful in avoiding probe damage. Moreover, higher spring strengths cause rapid wear as the pins meet more resistance in entering the sockets. Plating is worn away rapidly, and galling of the engaging surfaces can result. Also, as a pin enters a socket and contacts the conventional leaf spring, there is a high resisting force as the pin initially slides along the convex portion of the spring toward the center where the spring in its free position bows inwardly furthest toward the axis of the pin. Upon passing approximately the center of the spring the resisting force tapers off sharply. This high peak load can result in galling and rapid wear even when the average resisting force is not excessive. Stiff springs also may mean that it is difficult to secure the connector, because the collective resisting force encountered as the pins enter the sockets reaches considerable magnitude.

The present invention provides a socket arrangement that overcomes the above-enumerated difficulties and gives improved overall performance. According to this design, a floating plate is included within the socket and interposed between the spring and connector pin or test probe that is inserted into the socket. The plate protects the spring and will not allow the test probe or connector pin to damage it. Even in the extreme position of the plate the spring will not receive permanent deformation. This allows the spring to be relatively weak, reducing the resisting force for the entering pin and giving vastly improved wear properties. Peak loads are greatly reduced and galling of the pin will not occur. In order to achieve optimum electrical contact with the pin and to achieve production economies, the floating plate is curved transversely to form an elongated concave surface that receives the periphery of the pin. The spring for the plate preferably is made circular as well as curved about a diameter and, as a result, gives substantially uniformly increasing pressures on the floating plate as deformation of the spring progresses.

An object of this invention is to provide a connector socket of improved performance.

Another object of this invention is to provide a connector socket in which the spring is protected and will not be subject to damage from the test probe or otherwise.

A further object of this invention is to provide an electrical connector socket giving long wear and which will not gall the contact pin.

Yet another object of this invention is to provide a connector socket of relatively simple design which can be economically constructed, and which provides a good electrical connection.

An additional object of this invention is to provide a connector socket spring that is curved transversely of the socket and gives a spring force increasing substantially uniformly with deflection.

These and other objects will become apparent from the following detailed description taken in connection with the accompanying drawing in which:

FIGURE 1 is a longitudinal sectional view, partially in elevation, of the socket connector of this invention, FIGURE 2 is an enlarged transverse sectional view of the connector taken along line 2—2 of FIGURE 1, FIGURE 3 is a view similar to FIGURE 2 with the connector pin removed from the socket, FIGURE 4 is a fragmentary longitudinal sectional view taken along line 4—4 of FIGURE 2, FIGURE 5 is a perspective view of the floating plate removed from the socket, FIGURE 6 is a top plan view of the leaf spring that urges the floating plate inwardly, FIGURE 7 is a transverse sectional view similar to FIGURES 2 and 3 showing the floating plate in its extreme outer position, FIGURE 8 is a graph illustrating the forces encountered during engagement of a pin into the connector socket of this invention, as compared with conventional designs, and FIGURE 9 is a perspective view of a modified floating plate incorporating abutment flanges at its ends.

With reference to the drawing, the arrangement of this invention includes a socket assembly 10 adapted to receive a connector pin, 11. The latter member is of conventional design. The socket assembly 10 includes a central bore 12 of slightly greater diameter than the pin. Both the socket assembly and the pin 11 will be connected at their outer ends (not shown) to electrical wires which make up the circuit with which they are associated. Thus, current will flow between the pin and socket assembly when the pin is received in the socket as seen in FIGURE 1.

The socket assembly 10 includes an elongated member 13 which is cylindrical at its outer portion 14, and into the outer end wall 15 of which axially extends the bore 12. A sleeve 16 fits complementarily over the exterior periphery of the end portion 14 of the member 13 and is secured to the member 13.

Adjacent but inwardly of the outer end 15, the member 13 includes a slot 17. This slot may be made by cutting with a single pass through the wall of the member 13, thereby providing longitudinally extending bottom edges 18 and 19 for the slot, and end walls 20 and 21. The longitudinal edges 17 and 18 are located above the axis of the bore 12.

Received within the slot 17 is a floating plate 23. This member is generally rectangular in plan and is curved transversely about its longitudinal axis to provide a concave under surface 24 and a convex upper surface 25. The surfaces 24 and 25 have their axes of curvature generally parallel to the axis of the bore 12. The front and rear plate edges 26 and 27, as well as the longitudinal edges 28 and 29, are rounded as shown, providing convexly curved surfaces that smoothly flow into the concave under surface 24. These edges are defined by a radius tangential with surface 24 at the juncture with that surface. The plate 23 is made smaller in length, width and height than the slot 17 so that the plate 23 fits loosely within the confines of the slot 17.

Between the convex surface 25 of the plate 23 and the outer tubular member 16 of the socket assembly is a spring 30. This spring likewise is curved transversely of the socket but at a larger radius than the curvature imparted to the floating plate 23. The spring 30 is in the form of a disc, being made from a circular blank (indicated in FIGURE 6), which is bent diametrically. The radius of curvature of this bend is greater than that which generates the convex surface 25. This causes the spring 23 to engage the convex surface 25 of the floating plate at its central portion 31, and the inside wall of sleeve 16 at its outer edges 32 and 33. The overall dimensions of the spring are less than the confines of the opening 17 so that the spring is loosely received therein.

Consequently, when the pin 11 is inserted in the socket bore 12, as indicated in FIGURES 1 and 2, the periphery of the pin on one side will engage the inner concave surface 24 of the floating plate 23. The spring 30 will exert a force that biases the plate 23 toward the contact pin, assuring a firm engagement between the plate and the pin, and between the pin and the opposite side of the bore 12.

One of the advantages of this invention is that the inner surface 24 of the plate 23 can be made very nearly complementary to the exterior surface of the pin. Consequently, the plate makes a large area contact with the pin, assuring a good electrical connection and a secure engagement. The inwardly curved forward edge 26 of the plate 23 allows smooth entry of the pin into the socket, avoiding sharp edges and any tendency of one element to gouge the other.

The use of the disc-shaped spring 26 results in a spring force on the plate 23 as the pin enters the socket that increases in direct proportion to the amount of deflection of the spring. By being transverse of the socket, the spring 26 wraps itself progressively around the exterior convex surface 25 of the plate 23 as the plate moves upwardly toward the top of the slot 17. Accordingly, the distance A, that represents the free length of the beam that the spring presents between the central contact area 31 and the outer edges 32 and 33, becomes less as more of the spring comes into contact with the upper surface 25 of the plate 23. Because the spring 26 is circular, it provides a resisting force that increases at a constant rate as the spring is deflected, despite the fact that its free length is growing shorter at the same time. If it were not of this contour, the spring would become progressively stiffer as the free length decreased. With the spring made circular, however, it has an increasing reduction in cross sectional area toward the outer ends 32 and 33 of the spring where it bears against the inner surface of the tube 16. Thus, as there is a shorter free distance between the point of contact with the floating plate 23 and the ends which engage the inner periphery of the tube 16, so also is there less material in the spring to produce the spring force. Consequently, during the time that a contact pin slides into the socket and bends the spring 26, there is no sharp rise in spring force resulting from deflecting the spring in increasing amounts.

When the pin 11 is removed from the socket 12 the floating plate 23 drops downwardly to the position of FIGURE 3. It can be seen that the bottom edges 28 and 29 of the plate 23 then rests upon the longitudinal edges 18 and 19 of the slot 17. The parts are proportioned so that in this extreme position of the plate 23 it will not have dropped into the bore a sufficient amount to prevent entry of the pin 11. Hence, as the rounded nose of the pin 11 next enters the socket, it simply will react against the forward edge 26 of the floating plate 23, and then against the concave undersurface of the plate, to lift the plate upwardly to the positon of FIGURE 2.

With the edges 28 and 29 rounded, the engagement of the plate 23 and the bottom edges 18 and 19 of the recess is at a location outwardly of the bore 12. The plate 23 clears the surfaces 18 and 19 at their inner corners where they join the bore 12. This prevents any interference from burrs that may be present along these corners. When a test probe is moved within the socket, the tendency is to raise burrs at such locations. With the clearance afforded by the rounded edges of the plate this will not prevent the plate 23 from dropping to the bottom of the slot 17 and assuming a position of alignment with the socket.

By the construction described above, the spring 30 is entirely isolated from the connector pin 11 or from a test probe which may be inserted into the socket. At no time does the element entering the socket engage the spring. Instead, the floating plate 23 always is interposed between the member in the socket and the spring. Even in the event that a test probe should force the connector plate 23, and hence the spring 30, all the way to the upper extreme position, as shown in FIGURE 7, no damage to the spring can occur. The spring 30 simply will assume substantially the curvature of the inner wall of the tube 16, but will not be stressed beyond its elastic limit or even close to it. All portions of the spring will be fully supported by the plate 23, and there will be no localized pressures from contact of the test probe with the spring surface. Hence, no matter what the condition encountered, the spring will not be damaged from the test probe, the contact pin or other source.

This arrangement permits the use of a relatively thin spring exerting a small downward force against the connector plate 23. This is because of the full protection afforded the spring. For a size 16 contact, for example, the spring may be of beryllium copper having a maximum width of only .106 inch and a thickness of .005 inch. Consequently, when the pin enters the socket the resisting force is low. This means a connector incorporating a large number of the sockets in one unit is fitted together quite easily. The sum of the resisting forces of the mating pins and sockets still will remain low. Perhaps even more important, this small resisting force assures that the parts will tend to burnish each other, rather than galling, and that the connector will possess great wear resistance. With the floating plate moving upwardly smoothly against the resisting force of the spring 26, high peak loads upon pin insertion will be avoided. This is illustrated graphically in FIGURE 8, where curve B represents a typical pin and socket design of the prior art. There is a high load area, which may be well into the galling range, encountered from the large initial resistance of the spring as the pin moves into the socket, as described above. With the design of this invention, however, as indicated by the curve C, not only is the total spring force low, but there are no excessive peak loads.

It is possible under some circumstances, depending upon the size and purpose of the connector with which it is applied, to utilize a spring that does not have the disc shape described above. However, the circular spring offers the distinct advantages enumerated for it and normally will be utilized.

A modified floating plate construction is illustrated in FIGURE 9. This plate 34 is generally similar to the plate 23, but includes upstanding flanges 35 and 36 at either end. These flanges can engage the end walls 20 and 21 of the slot 17 and act as abutments to prevent any tendency of the floating plate to move out of the slot at the ends of the plate. The force of the pin 11 pushing on the plate will urge the plate axially inwardly of the bore 12. If the plate should happen to be cocked and if clearances have been made too great, the plate can enter the bore 12 at one end and prevent proper entry of the pin into the socket. With the flanges 35 and 36 projecting radially outward of the plate it will be blocked at its ends and prevented from working into the bore beyond the slot 17 no matter how great are the clearances within the socket. It should be noted, however, that the plate 34 is more difficult to manufacture than is the plate 23, and consequently is a more expensive part. Generally it is more feasible to manufacture to closer tolerances and employ the plate 23 than it is to utilize the more costly flanged plate 34.

The foregoing detailed description is to be clearly understood as given by way of illustration and example only, the spirit and scope of this invention being limited solely by the appended claims.

What is claimed is:
1. A connector device comprising
   a body,
      said body having an elongated cylindrical opening extending therein from one end thereof,
      and having a recess in the cylindrical wall of said opening adjacent but inwardly of said end of said body,
         said body having an outer surface at said recess,
   a floating plate received in said recess,
      said floating plate being movable toward and away from the axis of said opening,
      said floating plate being transversely curved to present a convex surface adjacent said outer surface at said recess,
      and an opposite concave surface generally aligned with the axis of said opening,
   and a spring engaging said convex surface of said floating plate and biasing said plate toward the axis of said opening,
      said spring being a circular disc bent diametrically to present a concave surface engaging said convex surface of said floating plate,
         and a convex surface having edges in engagement with said outer surface at said recess.
2. An electrical socket device comprising
   a first cylindrical tubular member,
   a second cylindrical tubular member complementarily receiving said first tubular member,
      said first tubular member having a slot through the circumferential wall thereof
         providing communication between the interior of said first member and the inner wall of said second tubular member,
   a floating plate loosely received in said slot,
      said floating plate being movable toward and away from the axis of said first member
         and having surfaces engageable with the edges of said slot for limiting such movement toward said axis,
      said floating plate being transversely curved so as to present a concave surface adjacent said axis and a convex surface adjacent said wall of said second member,
   and a spring interposed between said convex surface and said wall of said second member for biasing said floating plate toward said axis,
      said spring being a circular disc bent diametrically, said disc having a greater radius of curvature for said bend than the radius of curvature of said convex surface.
3. A device as recited in claim 2 in which the edges of said floating plate are rounded convexly where said edges join said concave surface.
4. An electrical connector socket device comprising
   an elongated cylindrical member having an axial bore extending inwardly from one end thereof,
      said cylindrical member having an aperture through the circumferential wall thereof communicating with said bore,
         said aperture having longitudinal edges substantially parallel to the axis of said bore, and end edges transversely thereof,
   a sleeve around said cylindrical member at said aperture,
   a floating plate in said aperture,
      said floating plate being a rectangular sheet bent so that it is curved transversely to present a concave undersurface adjacent the axis of said bore and a convex outer surface adjacent said sleeve,
         said surfaces being longitudinally aligned substantially with the axis of said bore,
      said floating plate having longitudinal edges engageable with said longitudinal edges of said aperture, and end edges engageable with said end edges of said aperture,
      said floating plate being of less overall width and length than that of the limits of said edges of said aperture,
         whereby said plate is loosely received in said aperture,
   and a spring in said aperture interposed between said convex surface of said floating plate and the inner surface of said sleeve,
      said spring being a circular disc bent diametrically, said bend of said disc being generated by a radius of curvature greater than the radius of curvature of said floating plate,
         whereby said spring engages said convex surface of said floating plate centrally thereof,
         and engages said sleeve at the outer edges thereof,
         and provides a resistance to movement of said floating plate outwardly from the axis of said bore toward said inner surface of said sleeve that increases substantially in direct proportion to such movement.
5. A device as recited in claim 4 in which said edges of said floating plate are rounded inwardly at the juncture of said edges and said concave surface.

References Cited by the Examiner

UNITED STATES PATENTS

| | | | |
|---|---|---|---|
| 1,093,972 | 4/14 | Cady | 339—255 X |
| 3,059,216 | 10/62 | Cunningham | 339—255 X |

FOREIGN PATENTS

| | | |
|---|---|---|
| 753,412 | 8/33 | France. |
| 913,815 | 6/46 | France. |
| 9,305 | 1914 | Great Britain. |
| 187,791 | 10/37 | Switzerland. |

JOSEPH D. SEERS, *Primary Examiner.*